United States Patent
Weeber et al.

(10) Patent No.: US 6,861,779 B2
(45) Date of Patent: Mar. 1, 2005

(54) SLIP RING BRUSH ASSEMBLY AND METHOD

(75) Inventors: Konrad Roman Weeber, Rexford, NY (US); Richard Kenneth Barton, Erie, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/870,567

(22) Filed: Jun. 1, 2001

(65) Prior Publication Data

US 2002/0047420 A1 Apr. 25, 2002

Related U.S. Application Data

(62) Division of application No. 09/342,571, filed on Jun. 29, 1999, now Pat. No. 6,281,610.

(51) Int. Cl.[7] .......................... H02K 13/00; H01R 39/08
(52) U.S. Cl. ...................... 310/148; 310/68 R; 310/232
(58) Field of Search ................................ 310/239, 251, 310/232, 240–242, 68 R, 71, 148, 149, 150, 151

(56) References Cited

U.S. PATENT DOCUMENTS

| | | | |
|---|---|---|---|
| 788,049 A | | 4/1905 | Johnson |
| 3,060,397 A | | 10/1962 | Mims et al. |
| 3,375,479 A | | 3/1968 | Lowe |
| 3,903,442 A | | 9/1975 | Krulls |
| 4,644,206 A | * | 2/1987 | Smith .......................... 310/115 |
| 4,895,536 A | * | 1/1990 | Gingerich et al. ........... 439/885 |
| 5,285,125 A | * | 2/1994 | Lang ............................ 310/240 |
| 5,490,198 A | | 2/1996 | Gerling |
| 5,549,019 A | * | 8/1996 | Cattani ........................ 74/573 R |
| 5,742,515 A | | 4/1998 | Runkle et al. |
| 5,814,915 A | * | 9/1998 | Wang ........................... 310/242 |
| 5,869,942 A | * | 2/1999 | Miller et al. ................. 318/483 |
| 5,976,047 A | * | 11/1999 | Woytaszek ................... 310/112 |
| 6,012,563 A | * | 1/2000 | Aoki et al. ............. 192/84.951 |
| 6,281,610 B1 | | 8/2001 | Kliman et al. |
| 6,356,002 B1 | * | 3/2002 | Witherspoon et al. ....... 310/232 |

FOREIGN PATENT DOCUMENTS

| | | |
|---|---|---|
| DE | 937244 | 12/1955 |
| DE | 1247461 | 8/1967 |
| GB | 1157885 | 7/1969 |

OTHER PUBLICATIONS

Westinghouse Electric & Manufacturing Co., Circular No. 1028, Apr. 2003, 16 pages.

A.M. Dudley, "Connecting Induction Motors" The Pratical Application of a Designing Engineer's Experience to the Problems of Operating Engineers, Armature Winders and Repair Men. Also the presentation to Students at Pratical Questions Arising in Winding and Connecting Alternating Current Motors, 1921, p. 204.

M. E. Hayes, "Current–Collecting Brushes in Electrical Machines", 1947, pp. 124–127.

H. E. Richards, Principles of Alternating–Current Machinery, 1953, pp. 161.

M. Liwschitz–Garik, et al, "Alternating–Current Machines", Second Edition, Apr. 1961, pp 119 & 261.

(List continued on next page.)

*Primary Examiner*—Tran Nguyen
(74) *Attorney, Agent, or Firm*—Ann M. Agosti; Patrick K. Patnode (57) ABSTRACT

An assembly for transferring current comprises at least one electrically conductive slip ring; at least one electrically conductive brush for supplying current to the at least one slip ring; and an electric or pressure actuator driven vibration source for changing the position of the brush with respect to the slip ring. If desired, brush current can shared by using inductance variations or by selective coupling of rotor windings to the slip rings.

12 Claims, 11 Drawing Sheets

OTHER PUBLICATIONS

Brown Boveri Review, Electrical Machines, "The Rotary Transformer", vol. 54, No. 9, Sep. 1967, pp. 554–564.

Ralph R. Lawrence, "Principles of Alternating–Current Machinery", 1953, p. 161.

Michael Liwschitz–Garik and Clyde C. Whipple, "Alternating Current Machines", Apr. 1961 (1st Edition Sep. 1946), pp. 119, 261.

Brown Boveri Review, "The Rotary Transformer", Sep. 1967, pp. 554–564.

Westinghouse Electric & Manufacturing Co., "Circular No. 1028", Apr. 1903.

A. M. Dudley, "Connecting Induction Motors", p. 204, Jan. 1921.

M. E. Hayes, "Current Collecting Brushes In Electrical Machines", pp. 124–127, Jan. 1947.

* cited by examiner

SLIP RING BRUSH ASSEMBLY AND METHOD

This application is a Division of 09/342,571, filed on Jun. 29, 1999, now U.S. Pat. No. 6,281,610.

BACKGROUND OF THE INVENTION

The invention relates generally to high power machines and more particularly to slip ring brush systems.

In high power, variable speed machines such as described by commonly assigned Runkle et al., U.S. Pat. No. 5,742,515, rotors are excited through electrically conductive slip ring assemblies. Conventional slip ring and brush assemblies transfer power at low voltage, moderate current levels and relatively high speeds. It would be useful to have assemblies that can accommodate thousands of amperes even when rotating at low speeds (about zero (0) to about one hundred (100) rotations per minute). In conventional slip ring and brush assemblies, rotating at low speeds may lead to localized overheating, marking, and deformation.

U.S. Pat. No. 1,157,885 of the London Patent Office to Brown, Boveri & Co. Ltd. describes a technique for "causing the brushes to be moved back and forth" by "using a device which serves to produce a periodic rotary motion of those parts of the machine on which the brushes are mounted." To accomplish this motion, "brush bridges are connected with the output shaft of a differential gear that changes their position, and an input shaft to this gear is equipped with means for altering the central position of the brush bridge, a second input shaft to this gear being provided with means for effecting a periodic back and forth rotation with variable amplitude." Azimuthal motion is thus achieved. The resulting assembly of this technique is difficult to control and to run at high voltages.

"Rotary Converters," Westinghouse Electric & Manufacturing Co., Circular No. 1028, April 1903, describes an embodiment wherein axial motion is achieved between brushes and a commutator on a rotor shaft by moving the entire rotor axially in an oscillatory manner. Moving the entire rotor shaft is awkward, may be harmful, requires significant power, and can limit the amplitude of motion.

Other limitations of variable high speed machines relate to the non-uniform current distribution through the brushes that contact the slip rings as well as the rotor winding leads that couple rotor windings to slip rings. Because the brushes typically are coupled by a common, single electrically conductive lead, the current varies between brushes depending upon the proximity to the conductive lead. Rotor windings are also coupled together prior to attachment to the slip rings and similar current variations result. Although stators are sometimes connected to stationary connection rings with separate leads, as shown in Lawrence, *Principles of Alternating-Current Machinery*, 4*th* Ed., McGraw-Hill Book Co. 1953, such configurations are not used for slip rings of wound rotor machines.

BRIEF SUMMARY OF THE INVENTION

Thus, there is a need for a reliable, low loss slip ring brush assembly that can efficiently accommodate a high level of current and voltage and a low rotation speed without gears. It would additionally be advantageous to have a slip ring brush assembly with uniform current sharing capabilities across the brushes and slip ring.

In accordance with one embodiment of the present invention, a brush for a slip ring is actuated with an electric or pressure actuator acting as an auxiliary driver to provide relative motion between the brush and the slip ring.

In accordance with another embodiment of the present invention, current is shared by using inductance variations or by selective coupling of rotor windings to the slip rings.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
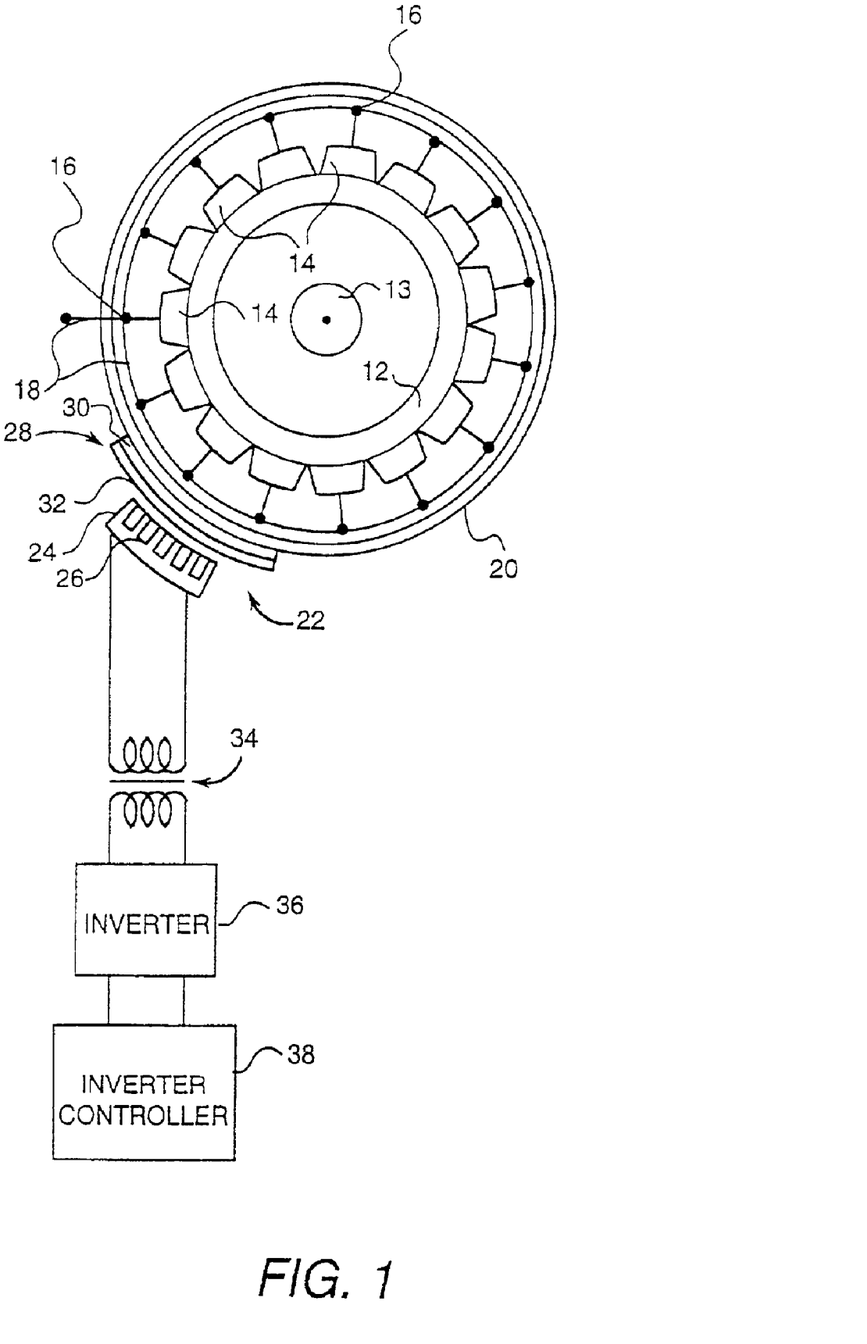
FIG. 1 is a front view of a slip ring brush assembly according to one embodiment of the present invention.
Figure 2:
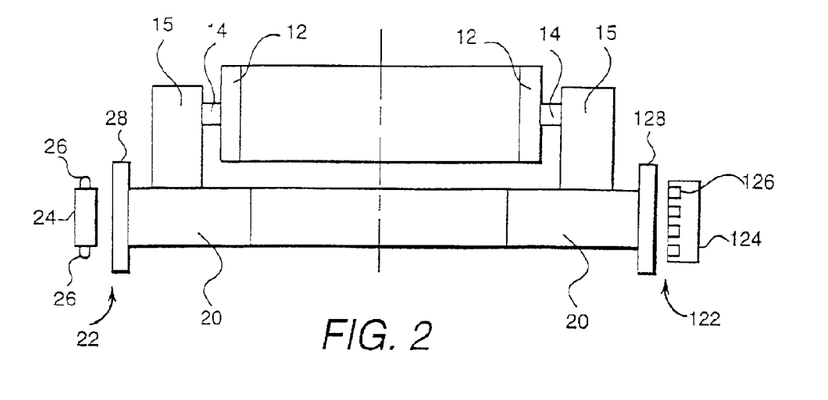
FIGS. 2–4 are side views of slip ring brush assemblies according to other embodiments of the present invention.
Figure 3:
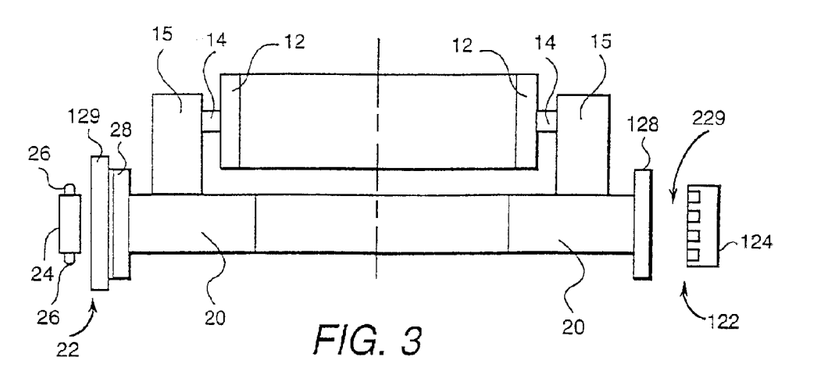
Figure 4:
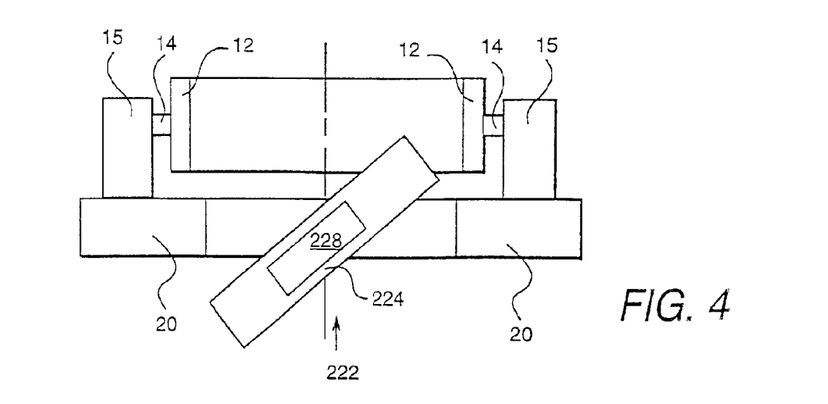

FIG. 1 is a front view of a slip ring brush assembly according to one embodiment of the present invention wherein at least one electrically conductive brush 14 (with an electrical connection 16) supplies current to at least one slip ring 12, and an electric actuator 22 or 122 (shown in FIGS. 2–3) oscillates the position of the at least one brush with respect to the at least one slip ring. FIGS. 2–4 are side views of slip ring brush assemblies according to other embodiments of the present invention.

Generally, brush 14 comprises a material such as carbon, and slip ring 12 comprises a material such as brass or copper. Slip ring 12 is coupled to a rotor shaft 13. When rotor shaft 13 is turning very slowly in either direction or stopped entirely, high concentrations of current can lead to local overheating of the slip ring and/or brushes. Generally, a plurality of brushes 14 are positioned to cover substantially all of the periphery of slip ring 12. Even though the current is less concentrated in multi-brush embodiments, the slip ring can still overheat locally and be damaged. Using an electric actuator to oscillate the brushes azimuthally and/or axially, as described below according to several embodiments of the present invention, is an efficient and beneficial technique for preventing such overheating and damage.

Typically, a plurality of brushes are coupled to a support frame 20. As is more clearly shown in FIG. 2, the support frame can be used to support brush holders 15 which in turn position brushes in electrical contact with slip ring 12. The support frame may comprise any structurally suitable material. In one embodiment, the support frame comprises a durable plastic laminate or steel, for example.

In the embodiment of FIG. 1, the electric actuator comprises at least one induction motor 22 including a stator 24 having stator windings 26. If the support frame comprises an appropriate electrically conductive material, it may serve as the secondary of motor 22. Alternatively a secondary 28 comprising copper or aluminum, for example, can be mechanically coupled to the support ring.

For purposes of illustration, motor 22 is shown as an arch induction motor, and the stator and secondary are shown as arches. An arch motor (sometimes referred to as a curved linear motor) is sufficient because motor 22 does not need to create full rotations. The arch will generally be in the range of thirty (30) mechanical degrees or less. Alternatively, if desired, the stator and/or secondary can be formed as complete cylinders. In one embodiment the secondary comprises a steel yoke 30 attached to the support ring and an aluminum rail 32 attached to the steel yoke.

An inverter 36 (controlled by inverter controller 38) can be used for driving the induction motor. In one embodiment, a high voltage isolation transformer 34 is electrically coupled between the inverter and the induction motor 22 to permit the brushes to be at a high voltage while maintaining a narrow gap between the stator and the secondary. In some embodiments, the high voltage isolation transformer is not needed. For example, as shown in FIG. 3, providing insulation 129 between the secondary and stator of motor 22 or providing sufficient space 229 between stator 124 and secondary 128 of motor 122 can negate risk of ground fault at the expense of a larger and less efficient actuator.

Each induction motor can be used to provide azimuthal and/or axial motion of the support frame. For example, motor 22 of FIGS. 1–3 can be used to provide azimuthal motion. Motor 122 of FIGS. 2–3 is rotated about ninety degrees with respect to motor 22 for providing axial motion. In the embodiment of FIG. 4, Motor 222 is rotated about forty-five degrees for simultaneously providing azimuthal and axial motion. A plurality of motors can be used around a single slip ring for purposes of providing different types of motion and/or for balancing. When a plurality of motors are used, it is useful to position the motors substantially symmetrically about the support frame. Symmetrical positioning is particularly useful for axial movement to raise the ring up and down uniformly while preventing the ring from significantly tilting.

Figure 5:
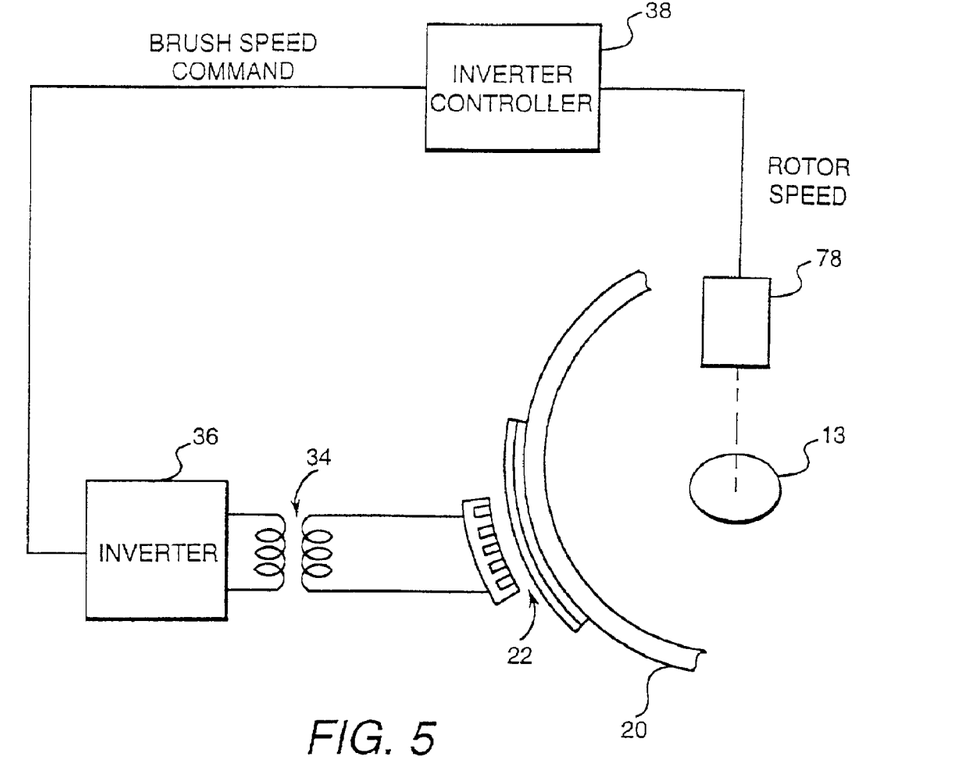
FIGS. 5–6 are block and function diagrams illustrating a control technique of the present invention.
Figure 6:
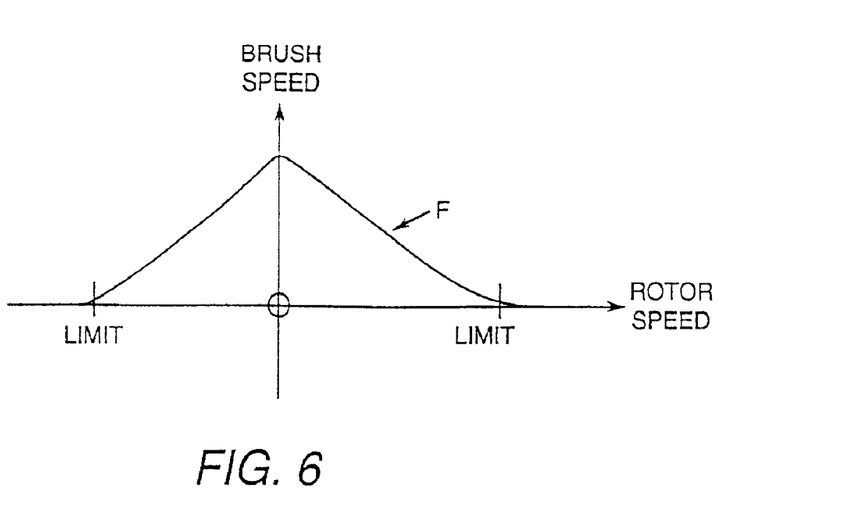

FIGS. 5–6 are block and function diagrams illustrating a control technique of the present invention. Inverter 36 can provide switchless oscillations, adjustable speed, and adjustable amplitude. The operation of the brush motion system can then be regulated by determining the motor speed value with a speed sensor 78 such as a tachometer, for example, and using the motor speed value to minimize the relative brush speed necessary to avoid damage and thereby minimize wear and carbon dust generation. FIG. 6 represents an example function which can be included in inverter controller 38 of FIG. 5 wherein at lower rotor speeds the brush speed command is highest while at or past a predetermined rotor speed magnitude limit the brush speed command is zero.

Additionally, the brushes themselves can optionally be axially staggered (not shown) in orderly or random patterns so that heating and damage will be distributed over a wider area as described in Hayes, *Current-Collecting Brushes in Electrical Machines*, pp. 124–127, Sir Isaac Pitman & Sons, Ltd., 1947. In one embodiment, brush positions vary periodically in several evenly-spaced periods of the circumference to minimize the number of tracks when using the balancing embodiment of FIG. 13.

Figure 7:
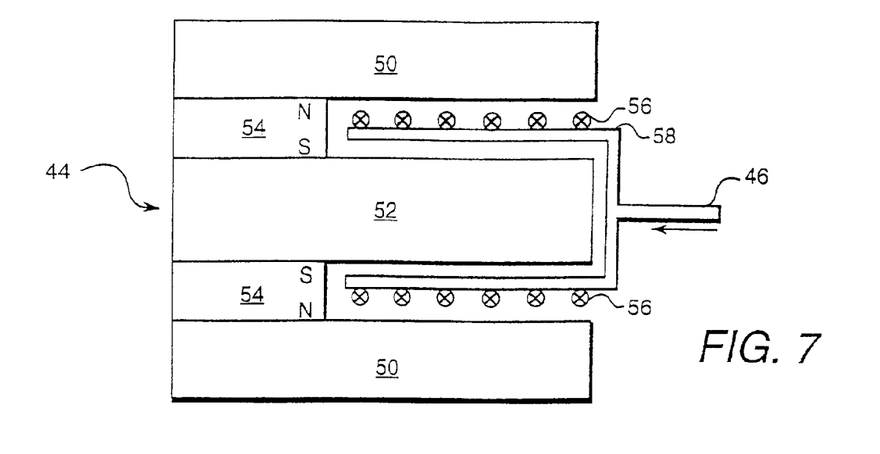
FIGS. 7–9 are a sectional side view of a voice coil actuator and front and side views of slip ring brush assemblies according to other embodiments of the present invention using a voice coil actuator.
Figure 8:
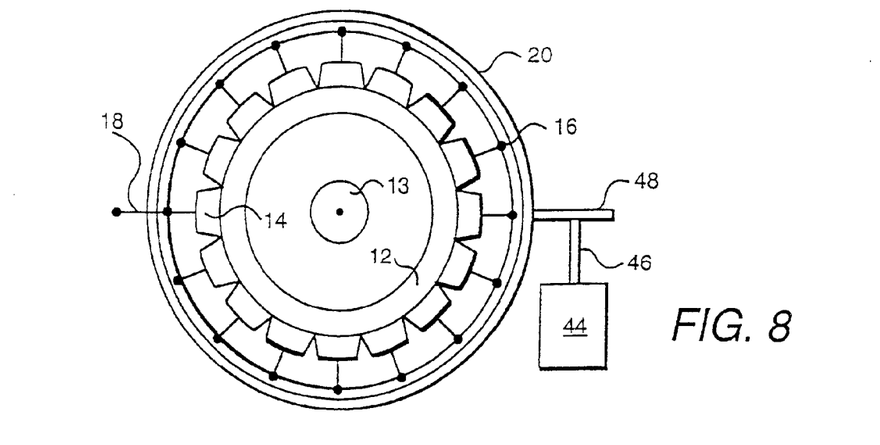
Figure 9:
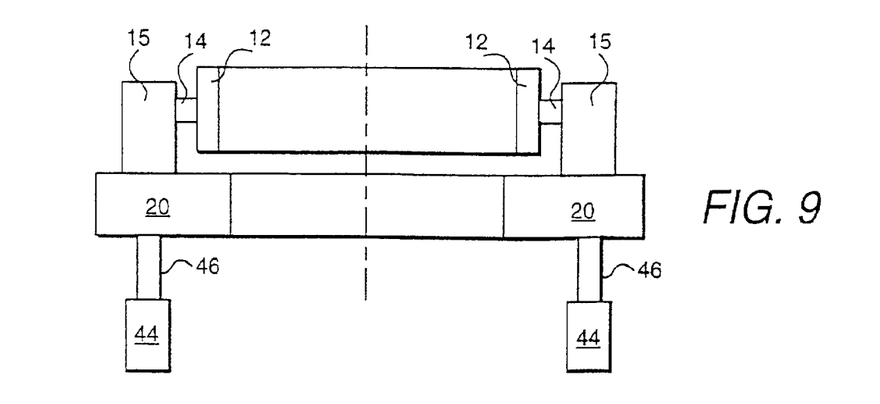

FIGS. 7–9 are a sectional side view of a voice coil actuator 44 and front and side views of slip ring brush assemblies according to other embodiments of the present invention with the voice coil actuator mechanically coupled to support frame 20. The embodiments and options of FIGS. 7–9 are similar to those of FIGS. 1–4 except that a voice coil actuator is more appropriate for embodiments wherein a smaller amplitude of movement or a higher frequency of oscillation is desired. It is expected that a voice coil actuator will provide an amplitude (azimuthal or axial) of a few millimeters at a frequency range in the tens of hertz whereas a motor will provide an amplitude of several centimeters or more at a frequency of about one hertz or less.

There are many types of voice coil actuators. One type is shown in FIG. 7 for purposes of example. In FIG. 7, a magnetic core 52 is surrounded by a magnetic yoke 50 with permanent magnets 54 positioned therebetween on one side. A shell 58 (wound with electrically conductive windings 56) is positioned between the core and yoke and coupled to an arm 46 on the other side. Typical materials include a core comprising magnetic steel, a yoke comprising magnetic steel, and a shell comprising plastic or another non-magnetic material, for example. Current is applied to windings 56 between the shell and the yoke to oscillate the shell and thus the arm. In the embodiment of FIG. 8, arm 46 applies pressure to an extension 48 of support frame 20. If the arm applies pressure perpendicularly to the support frame, the movement will be substantially azimuthal. If the mechanical movements are angled, axial and azimuthal movement can be provided. Extension 48 is shown for purposes of example. Another example of an actuation embodiment is shown in FIG. 9 wherein arms 46 provide mechanical movement directly to the support frame for axial oscillations.

Figure 10:
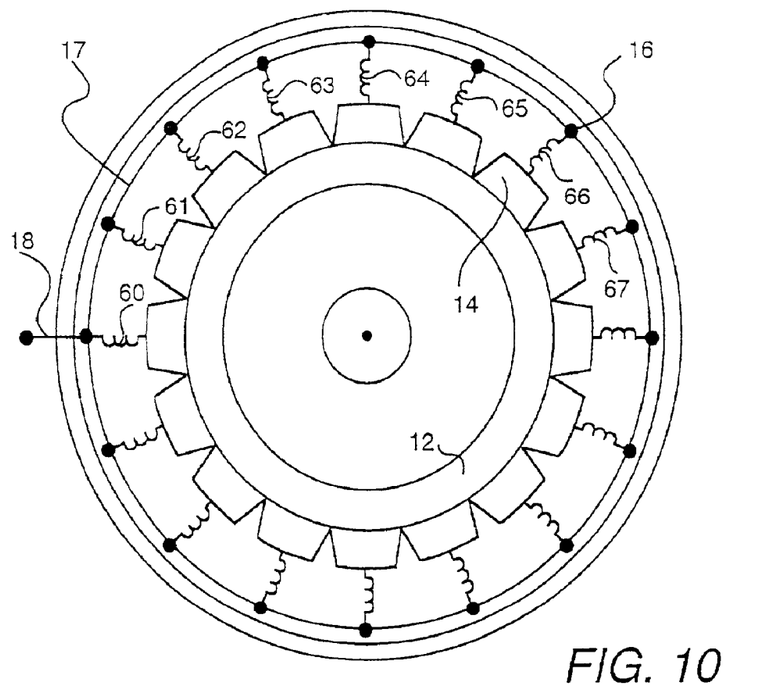
FIG. 10 is a front view of a slip ring brush assembly according to another embodiment of the present invention.
Figure 11:
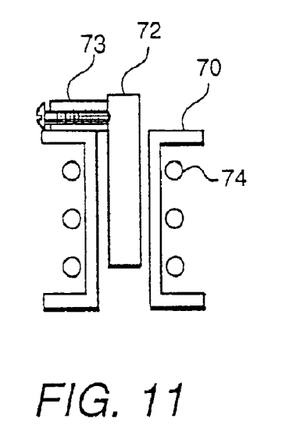
FIGS. 11 and 12 are side views of several forms of inductors for use in the embodiment of FIG. 10.
Figure 12:
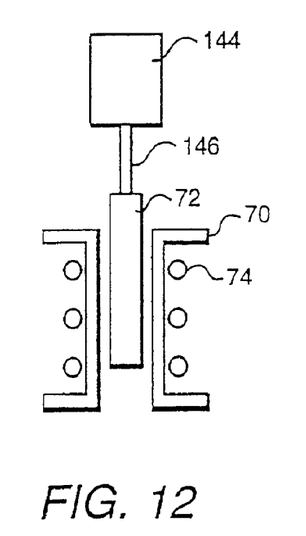

FIG. 10 is a front view of a slip ring brush assembly according to another embodiment of the present invention, and FIGS. 11 and 12 are side views of several forms of inductors for use in the embodiment of FIG. 10. In exciters using DC or very low frequency AC voltages, current imbalance is due only to resistance differences between the brushes and the electrical connections. In line frequency systems, mutual and self-inductance variations worsen current imbalances and dominate the current distribution.

The embodiment of FIGS. 10–12 includes at least one electrically conductive slip ring 12 and a plurality of electrically conductive brushes 14 for supplying current to the at least one slip ring. Each of the electrically conductive brushes is coupled through an electrical connection 16 to adjacent ones of the electrically conductive brushes through a common electrical interface 17 with at least one electrically conductive lead 18 being coupled to the common electrical interface.

In one embodiment, a plurality of inductors shown as 60–67 are each situated on a respective one of the electrical connections with at least one of the inductors 60 being situated closer to the electrically conductive lead and having a higher inductance value than at least one other of the inductors that is situated farther from the at least one electrically conductive lead. In some embodiments, an inductor is present on each of the electrical connections. Alternatively, in some embodiments, brushes farther from the at least one electrically conductive lead may have no inductors coupled thereto. If multiple leads are used, as described below with respect to FIG. 13, for example, brushes closer to the leads will have higher inductances than brushes farther from the leads. If each inductor comprises an adjustable variable inductance inductor, the current distribution can be fine-tuned.

In one embodiment, as shown in FIG. 11 each inductor comprises a coil form (insulator) 70, a winding 74 wound on the coil form, and an adjustable position magnetic core 72 comprising iron, for example. To improve performance at line frequencies, core 72 may comprise laminated or powdered iron, for example. A set screw 73 can be used for fixing the position of the core once balance is achieved.

In another embodiment, as shown in FIG. 12, each inductor can be automatically adjusted for different rotor positions by using a voice coil actuator 144 with arm 146 to move magnetic core 72 in and out of a plunger-type inductor form 70. Currents through individual brushes can be measured with current sensors (not shown) and used to control core position via the voice coil actuators and hence to control inductance. This embodiment can provide a closed-loop operation that compensates for changing self and mutual inductances as the rotor position changes.

In an alternative embodiment, variable inductance inductors are not included. The current distribution in the brushes depends on self and mutual inductances of all the conductors in the path of current flow through the slip ring. For a given rotor position, the distribution of different inductances around the perimeter of distributor ring 16 will achieve equal current sharing between brushes 14. If the rotor position changes, to maintain strong current balance the inductance values may need to be adjusted, making it difficult to compensate for all different rotor positions without using the embodiment discussed above with respect to FIG. 12. However, current sharing can be enhanced by increasing the self inductances of the radial current paths by at least one order of magnitude by inserting the inductors 60–67 in the radial current paths. Such use of the inductors causes the self inductances to dominate the current distribution, thus reducing the influence of the mutual inductances and also the self inductances of the peripheral current paths through electrical connections 16. Because inductors 60–67 are positioned in the radial current paths, they are in parallel. The inductances can all be made substantially equal and of larger value (that is sufficient to cause the self inductances to dominate) than in the peripheral current paths. Hence, inductors of a substantially equal value can be used to achieve current sharing independent of rotor position.

Figure 13:
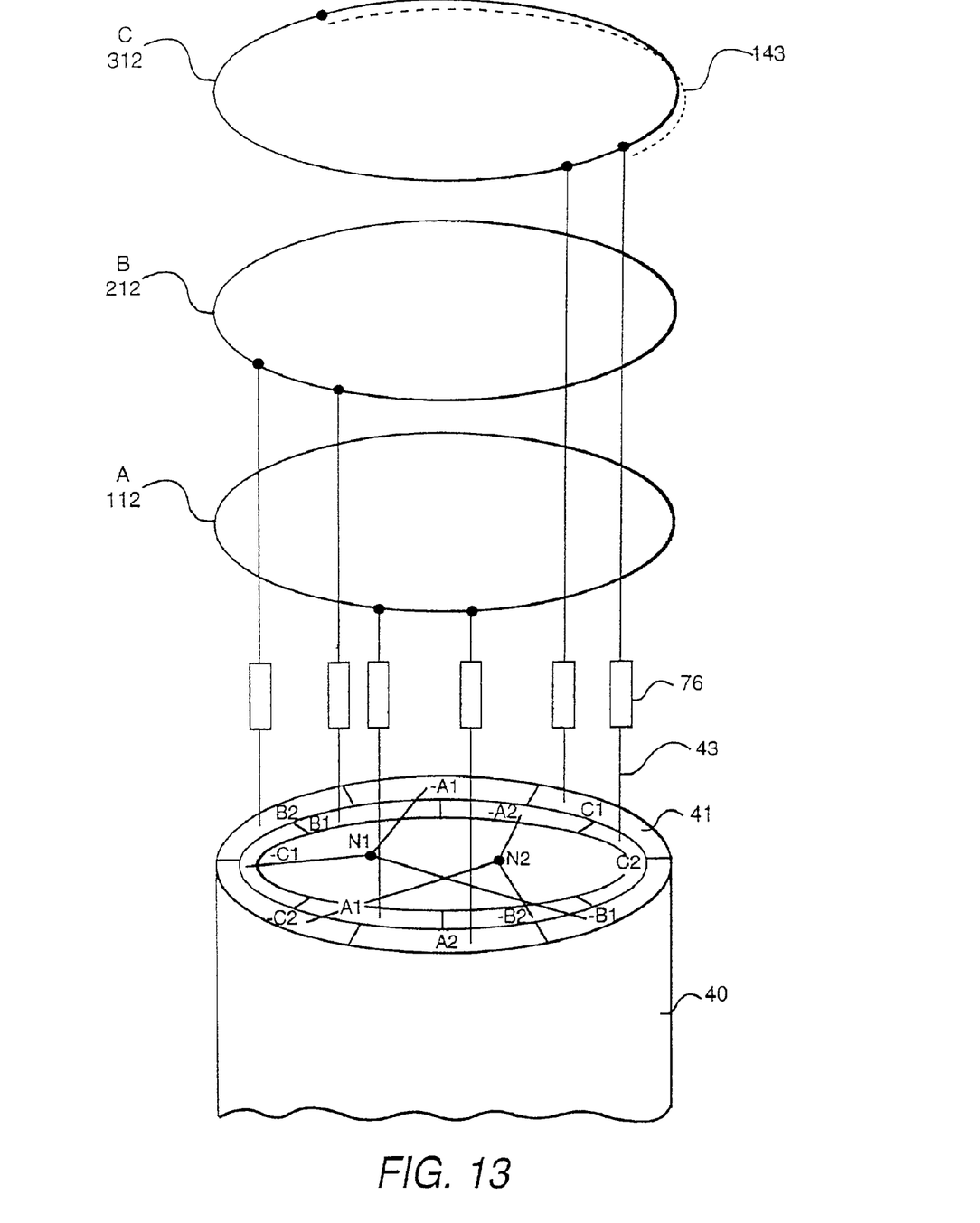
FIG. 13 is a schematic perspective view of an assembly with rotor winding leads coupling rotor windings to slip rings according to another embodiment of the present invention.
Figure 14:
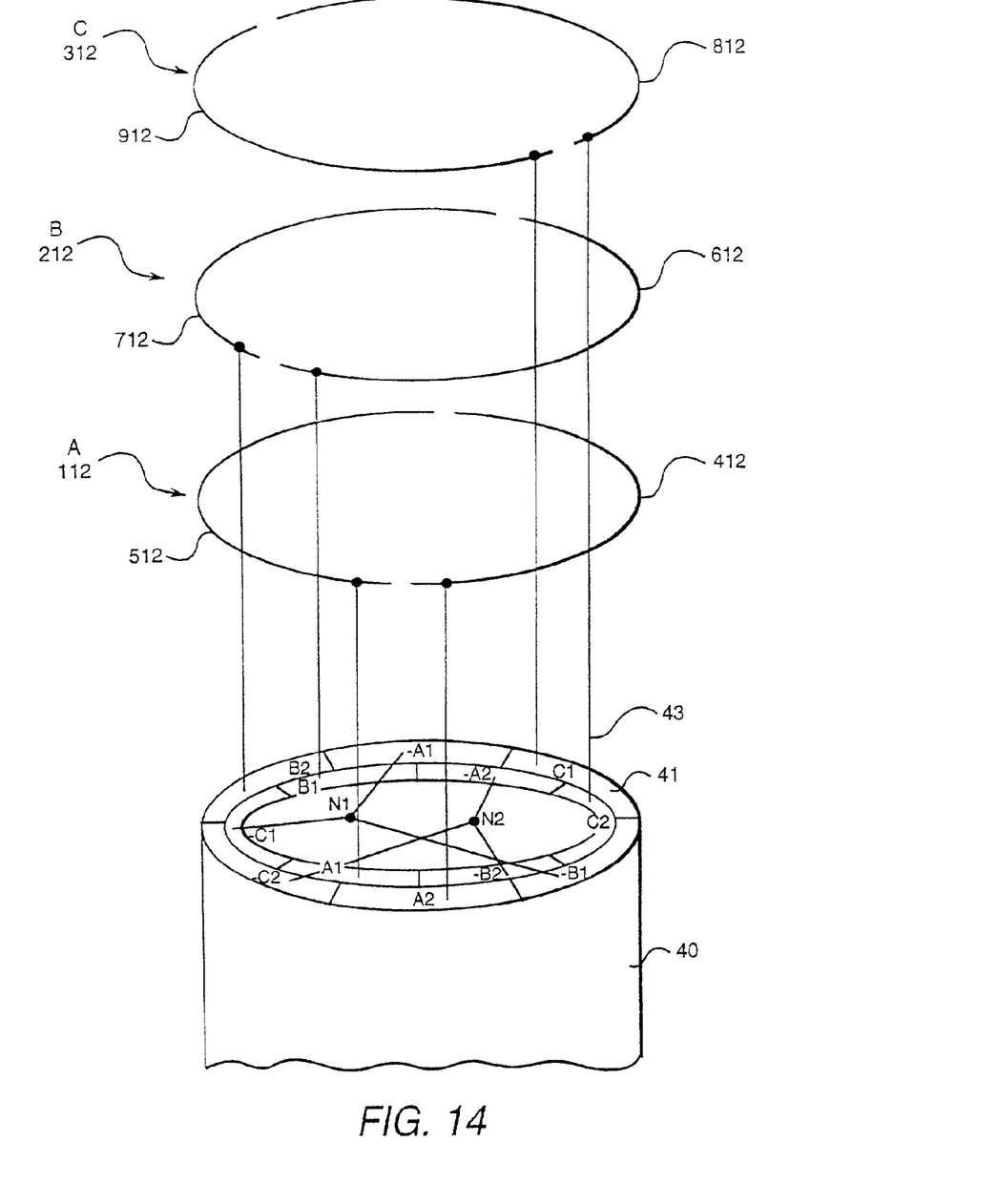
FIGS. 14 and 15 are schematic perspective views of assemblies with rotor winding leads coupling rotor windings to slip rings according to other embodiments of the present invention.
Figure 15:
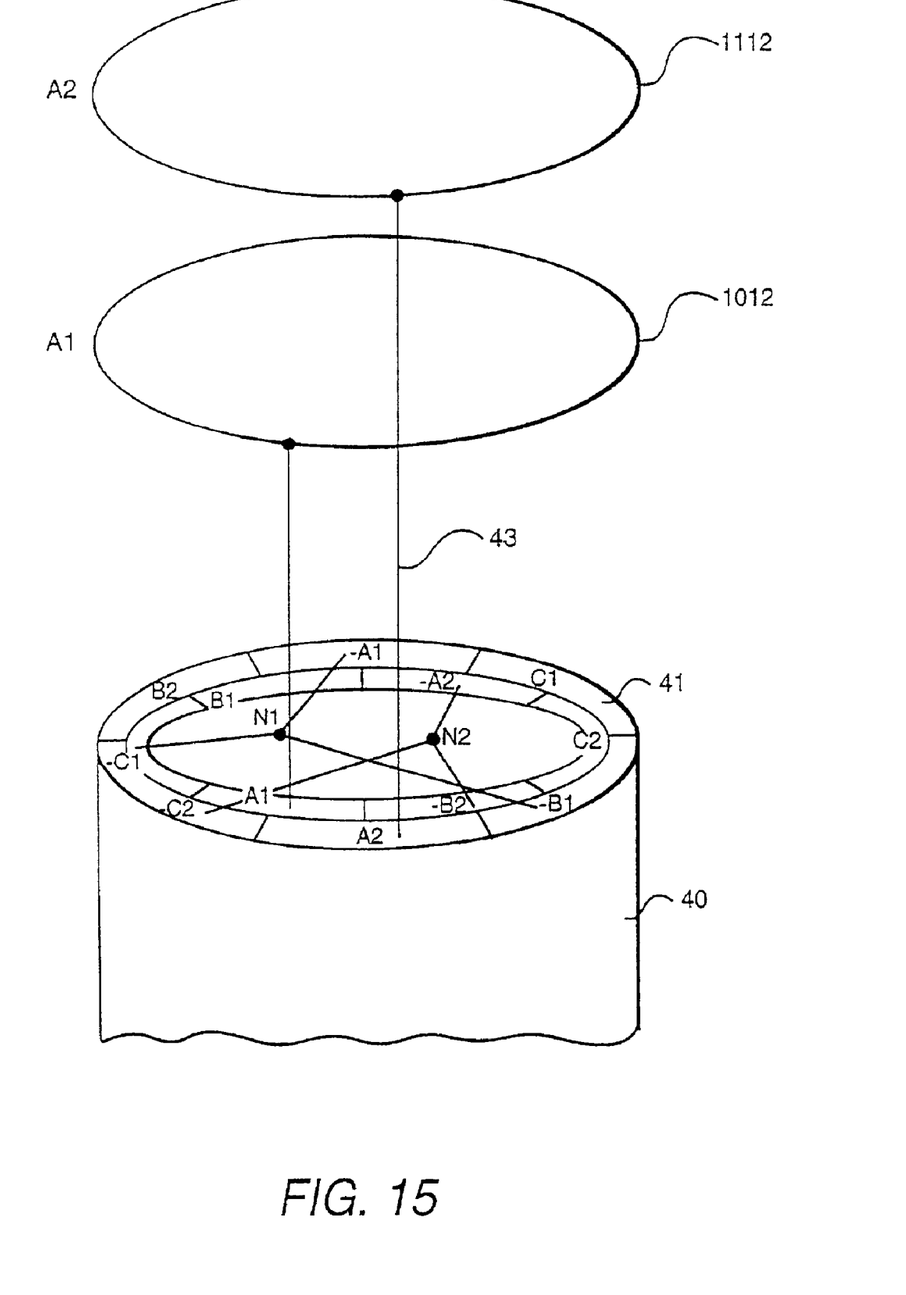
Figures 16, 17, 18, 19:
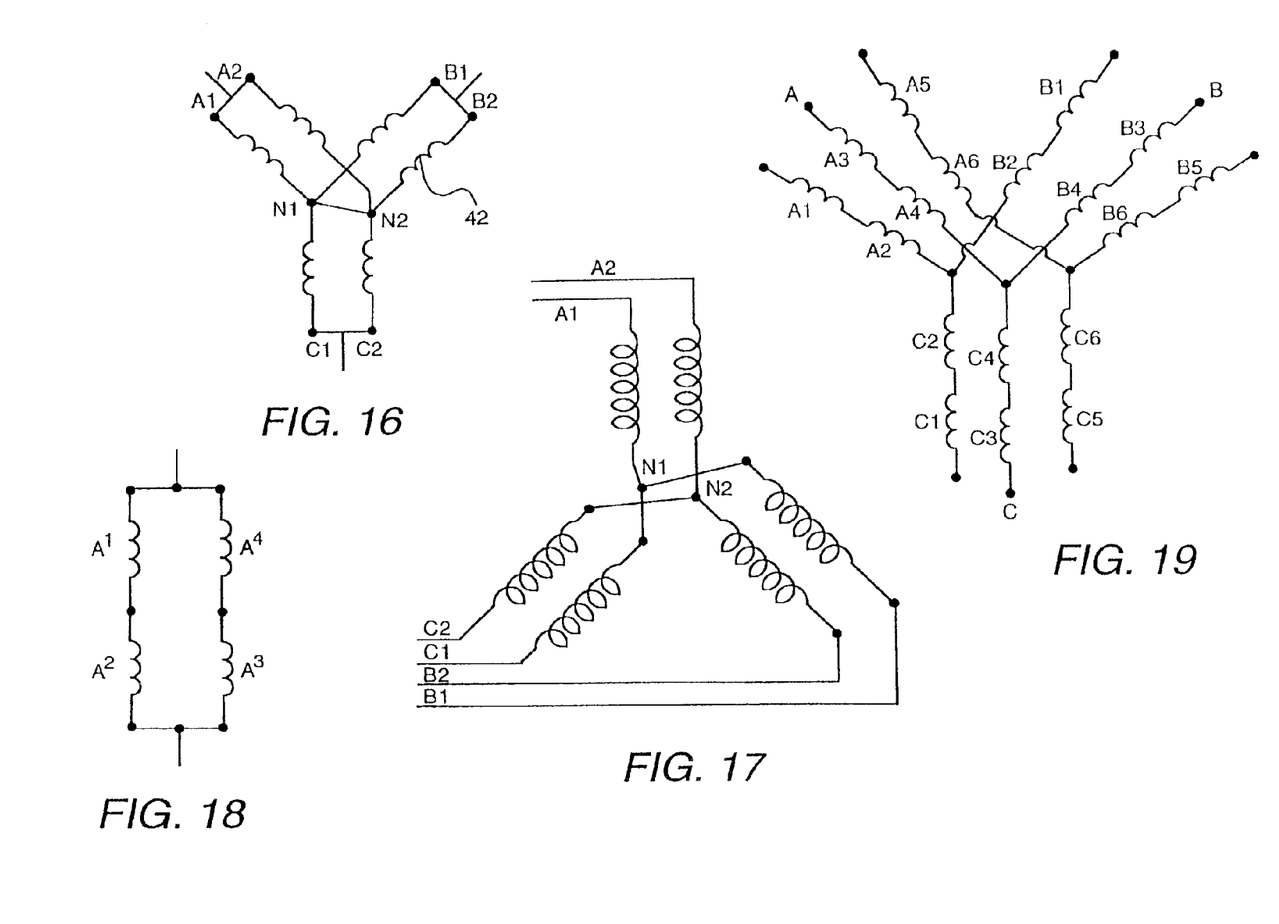
FIGS. 16–18 are circuit diagrams illustrating several different connection implementations for slip ring coupling of the present invention.
FIGS. 19 and 20 are a circuit diagram and a schematic perspective view of one example of a six pole winding embodiment of the present invention.

FIG. 13 is a schematic perspective view of an assembly with rotor winding leads coupling rotor windings to slip rings according to another embodiment of the present invention; FIGS. 14 and 15 are schematic perspective views of assemblies with rotor winding leads coupling rotor windings to slip rings according to other embodiments of the present invention; and FIGS. 16–18 are circuit diagrams illustrating several different connection implementations for slip ring coupling of the present invention.

In these embodiments each assembly includes a rotor shaft 13 (such as shown in FIG. 1); a rotor 40 coupled to the rotor shaft; a plurality of rotor winding regions or phase belts 41 each including respective rotor windings 42 (shown schematically in FIG. 16) wound through the rotor; a plurality of electrically conductive slip rings coupled to the rotor shaft; and rotor winding leads 43 coupling the rotor windings to the slip rings, at least some of the rotor winding leads coupled directly to respective ones of the slip rings. Conventional embodiments have individual poles coupled for each phase coming out of the rotor winding with the combination being fed to the slip ring. In the embodiments of the present invention shown in FIGS. 13–18, at least some of the rotor winding leads are coupled directly to the slip rings rather than being coupled to another rotor winding lead for joint coupling to the slip rings.

In the embodiment of FIG. 13, for example, each rotor winding lead 43 couples each rotor winding directly to a respective one of the slip rings 112, 212, or 312 and multiple rotor winding leads are coupled to each of the slip rings. In one embodiment, the windings are coupled in substantially evenly-spaced positions by, if necessary, adjusting the location of at least one of the connections as shown schematically by dashed line 143 representing an alternative rotor winding lead connection to slip ring 312.

For ease of illustration, a wye (Y) connected two pole rotor is shown in FIG. 13. The phase A1 winding area for the first pole is coupled directly to slip ring 112, and the phase A2 winding area for the second pole is additionally coupled directly to slip ring 112. By spacing the connections to the slip ring substantially evenly, current is shared/distributed most efficiently and differences in brush current due to unequal. paths and inductances are minimized. The phase B1, B2, C1, C2 windings are likewise coupled respectively to slip rings 212 and 312.

These connections may be conveniently achieved by the use of modern high voltage cable so that the individual circuits will be well insulated and there will be flexibility in the arrangements. In particular it may not be necessary to put the slip rings next to a motor/converter if the slip ring would otherwise be better accessible for maintenance. For example, in some embodiments a torque (power flow) control rotor (not shown) is coupled to a motor converter rotor with the slip rings being coupled adjacent the motor converter rotor. In one embodiment of the present invention, the torque control rotor can be positioned in between the motor converter rotor and the slip rings, and the rotor winding leads can be threaded through spider openings, cooling holes, or specifically formed openings (not shown) in the torque control rotor.

The embodiment of FIG. 13 further illustrates inductors 76 on rotor winding leads 43. These inductors can be used in a similar manner as discussed with respect to inductors 60–67 of FIG. 10 to adjust for small inductance differences that create current distribution imbalances.

In the embodiment of FIG. 14, at least some of the rotor slip rings 112, 212, and 312 comprise segmented rotor slip rings. In this embodiment, each rotor winding lead 43 is coupled by itself to a respective slip ring segment 412, 512, 612, 712, 812, or 912, and current remains in the respective slip ring segment to assist in providing more uniform current distribution. The slip rings can be segmented by physical separation with air therebetween or with an insulating material therebetween.

In the embodiment of FIG. 15, each rotor winding lead 43 couples each rotor winding directly to a unique respective one of the slip rings, shown for purposes of example as 1012 or 1112. For purposes of illustration, only the phase A slip rings are shown. This embodiment does not address the issue of peripheral current sharing, but provides an embodiment more easily cooled and less prone to overheating.

FIGS. 16–18 are circuit diagrams illustrating several different connection implementations for slip ring coupling of the present invention. The illustrations are shown as wye connections for purposes of example. Many alternative connection embodiments exist, even for single circuit per phase arrangement (not shown). For example, each phase is typically coupled to a separate slip ring. The phase neutrals can be coupled together and optionally further coupled to a fourth slip ring. Alternatively, the phase neutrals can each be coupled to individual slip rings (for a total of six slip rings).

FIGS. 16–17 represent embodiments with two parallel circuits per phase. FIG. 16 represents a three phase circuit diagram for the embodiment of FIG. 13 wherein each of the rotor winding leads from a first pole is coupled to a slip ring along with its respective phase from the second pole, and the neutrals are coupled together. FIG. 17 can be used to represent a diagram for either the embodiment of FIG. 14 or the embodiment of FIG. 15 with each pole being coupled to a separate slip ring or slip ring segment. In alternative related embodiments, the neutrals can be brought out to separate slip rings or a shared slip ring.

A four pole machine with four circuits per phase may be arranged in parallel in a similar manner as described with respect to FIGS. 16 and 17. Alternatively, as shown in FIG. 18 (where only one phase is shown for purposes of example), two pairs ($A^1$ and $A^2$, $A^3$ and $A^4$) of poles can be coupled to each other with each pair being separately coupled to a slip ring for each phase (via $A^1$ and $A^4$). The above embodiments were for purposes of example, and other multi-pole Y and delta ($\Delta$) arrangements can be used as desired.

Figure 20:
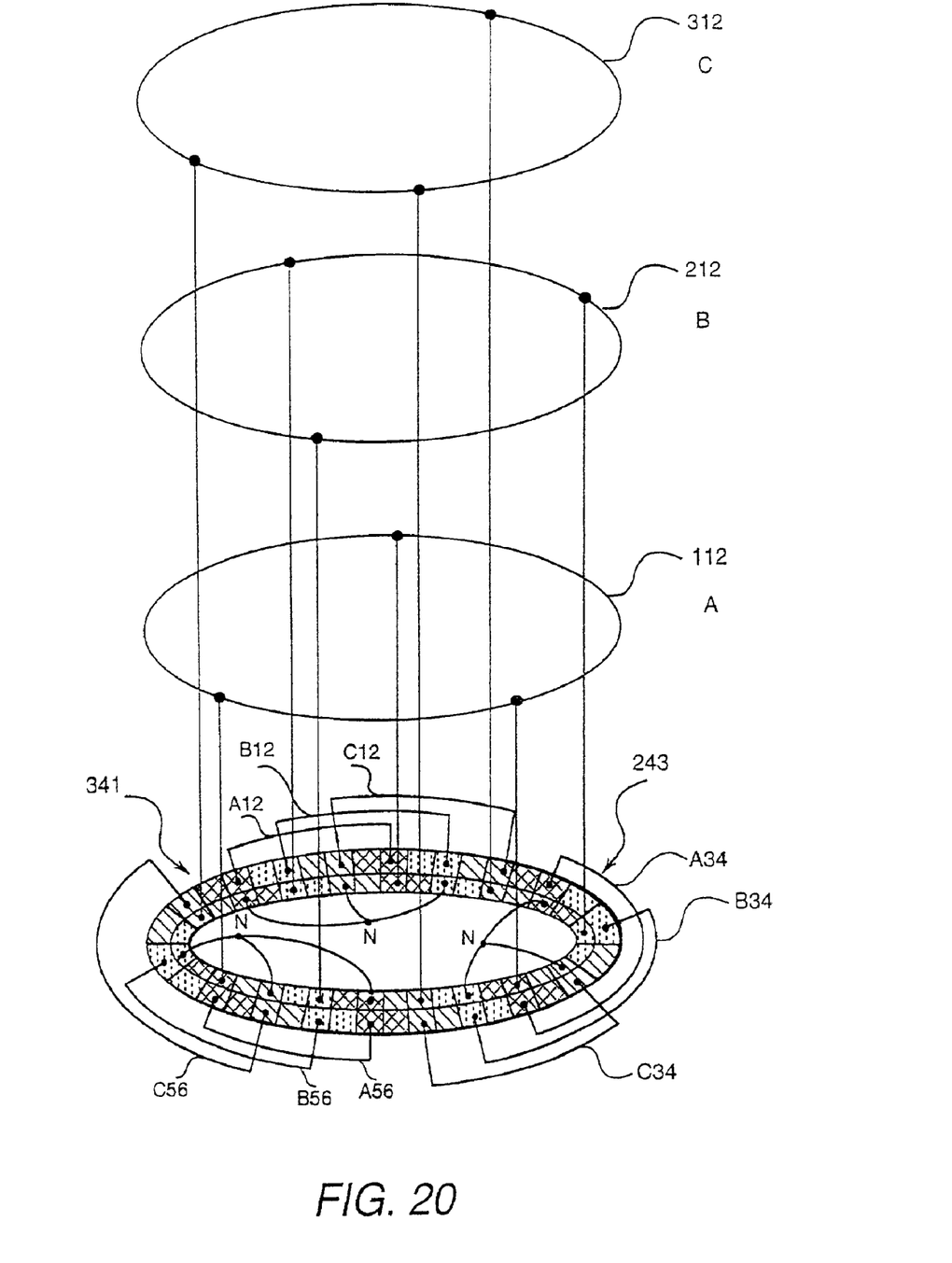

FIGS. 19 and 20 are a circuit diagram and a schematic perspective view of one example of a six pole winding embodiment of the present invention. In this embodiment a three phase machine has six poles with two slots per pole per phase for a total 36 slots. There are six slots per pole wound at ⅚ pitch for purposes of illustration. The poles are coupled in pairs through pole connections 243 resulting in a three circuit machine as shown in FIG. 19. Each phase belt is represented by rotor winding areas 341. A two layer lap winding with inner winding regions (bottom of slot) 141 and outer wiriding regions (top of slot) 241 is shown, for example. The three resulting circuits are wye connected for purposes of example. In the embodiment of FIG. 20, rotor winding leads 43 are evenly spaced and can be brought directly to slip rings 112, 212, and 312 in substantially evenly spaced connections without the adjustments discussed with respect to FIG. 13.

Figure 21:
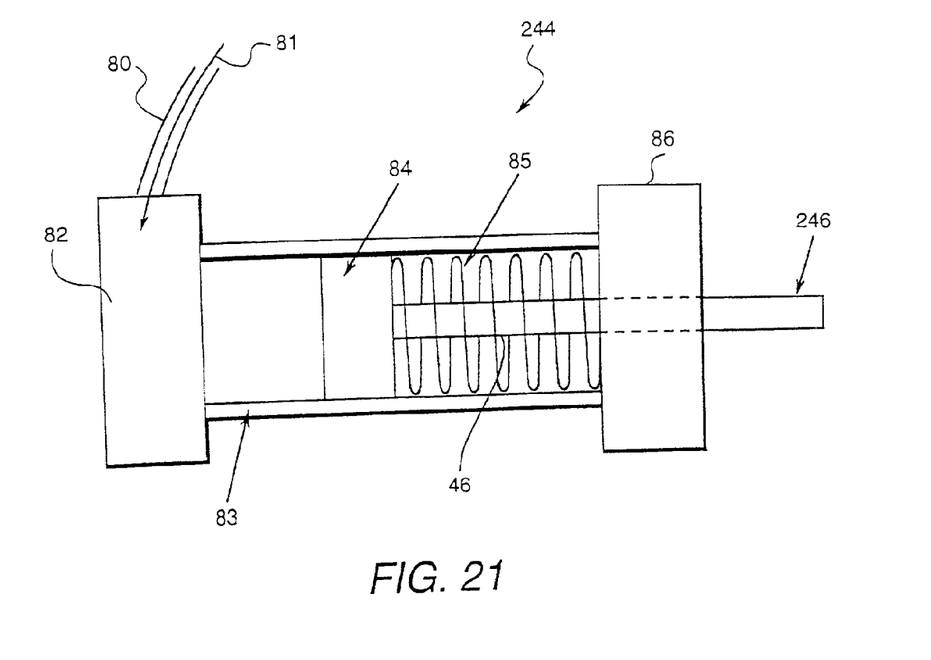
FIGS. 21 and 22 are side views of two pressure actuators that can be used in embodiments similar to those of FIGS. 8 and 9.
Figure 22:
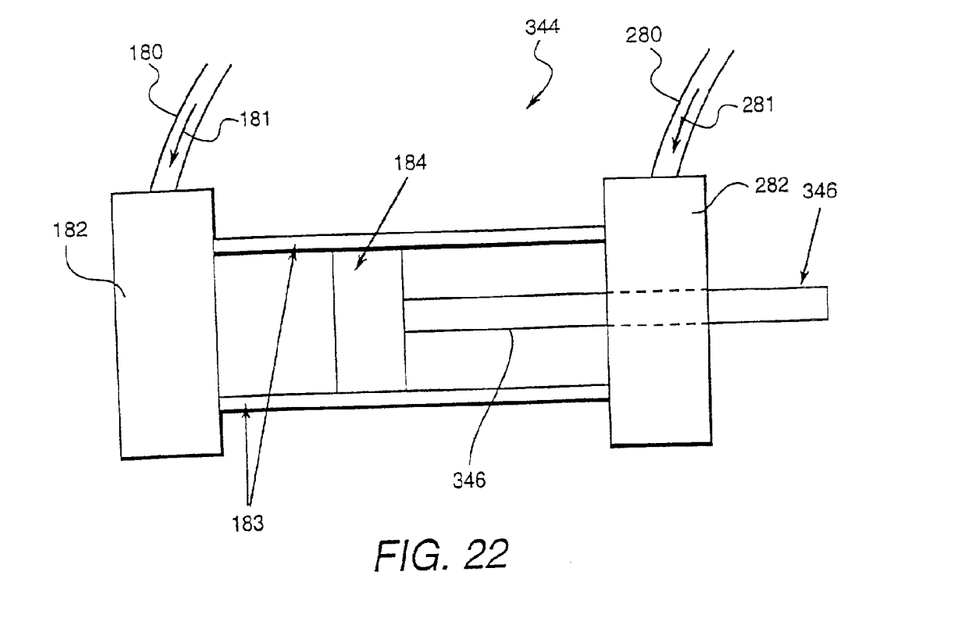

FIGS. 21 and 22 are side views of two pressure actuators that can be used in embodiments similar to those described with respect to the voice coil actuators of FIGS. 8 and 9. In these embodiments at least one pressure actuator 244 in FIG. 21 or 344 in FIG. 22 is used for oscillating the position of at least one brush 14 (FIG. 8) with respect to at least one slip ring 12 (FIG. 8). As discussed with respect to FIG. 9, one or more actuators can be positioned about a brush support frame 20 (FIG. 8), and one or more actuators can be oriented to provide azimuthal and/or axial motion.

FIG. 21 illustrates one embodiment of a pressure actuator comprising a hydraulic actuator including a fluid hose 80 for supplying a fluid 81 through an end cap 82 to an actuator cylinder 83 wherein the fluid presses against a piston 84 coupled to a spring 85 attached to a end cap/spring support 86. An arm 246 is coupled to piston 84. The position of arm 246 is controlled by the pressure from the fluid and the strength of the spring. Arm 246 can be coupled to a support frame as shown in FIGS. 8 and 9. The fluid pressure can be controlled by electronics in a manner so as to create a desired oscillation speed as described with respect to FIGS. 5 and 6.

FIG. 22 illustrates one embodiment of a pressure actuator comprising a pneumatic actuator including air hoses 180 and 280 for supplying air 181 and 281, an actuator cylinder 183, a piston 184 coupled to an arm 346, and end caps 182 and 282 which permit air to enter the cylinder and serve as travel stops for the piston. The position of arm 346 is controlled by the relative pressure supplied from the air hoses. Arm 346 can be coupled to a support frame as shown in FIGS. 8 and 9. The air pressure can be controlled by electronics in a manner so as to create a desired oscillation speed as described with respect to FIGS. 5 and 6. Further, the air hoses can be used to provide high voltage isolation. In one embodiment, the air hoses comprise a nonmetallic, elastomer material.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An assembly for transferring current, the assembly comprising:
   at least one electrically conductive slip ring;
   a plurality of electrically conductive brushes for supplying current to the at least one slip ring, each of the electrically conductive brushes being coupled through an electrical connection to a respective ones of the electrically conductive brushes through a common electrical interface;
   at least one electrically conductive lead coupled to the common electrical interface;
   a plurality of inductors, each situated on a respective one of the electrical connections for modifying a self-inductance of the respective electrical connection.

2. An assembly for transferring current, the assembly comprising:
   at least one electrically conductive slip ring;
   a plurality of electrically conductive brushes for supplying current to the at least one slip ring, each of the electrically conductive brushes being coupled through an electrical connection to a respective one of the electrically conductive brushes through a common electrical interface;
   at least one electrically conductive lead coupled to the common electrical interface;
   a plurality of inductors, each situated on a respective one of the electrical connections, wherein each of the inductors is positioned in a parallel current path for increasing a self inductance of the respective parallel current path by at least one order of magnitude.

3. The assembly of claim 2 wherein each one of the inductors has an inductance that is substantially equal to inductances of each of the other inductors.

4. An assembly for transferring current, the assembly comprising:
  at least one electrically conductive slip ring;
  a plurality of electrically conductive brushes for supplying current to the at least one slip ring, each of the electrically conductive brushes being coupled through an electrical connection to a respective one of the electrically conductive brushes through a common electrical interface;
  at least one electrically conductive lead coupled to the common electrical interface;
  a plurality of inductors, each situated on a respective one of the electrical connections;
  at least one electrically conductive lead coupled to the common electrical interface, wherein at least one of the inductors is situated closer to the at least one electrically conductive lead and has a higher inductance value than at least one other of the inductors situated farther from the at least one electrically conductive lead.

5. An assembly for transferring current, the assembly comprising:
  at least one electrically conductive slip ring;
  a plurality of electrically conductive brushes for supplying current to the at least one slip ring, each of the electrically conductive brushes being coupled through an electrical connection to a respective one the electrically conductive brushes through a common electrical interface;
  at least one electrically conductive lead coupled to the common electrical interface;
  a plurality of inductors, each situated on a respective one of the electrical connections, wherein each inductor comprises an adjustable variable inductance inductor.

6. The assembly of claim 5 wherein each inductor comprises a coil form, a winding wound on the coil form, and an adjustable position magnetic core.

7. The assembly of claim 6 further including a plurality of voice coil actuators for controlling the positions of the adjustable magnetic cores.

8. A method for fabricating an assembly for transferring current, the method comprising:
  coupling a plurality of electrically conductive brushes for supplying current to at least one electrically conductive slip ring through a plurality of respective electrical connections to adjacent ones of the electrically conductive brushes through a common electrical interface;
  coupling at least one electrically conductive lead to the common electrical interface;
  situating a plurality of inductors, each on a respective one of the electrical connections for modifying a self-inductance of the respective electrical connection.

9. A method for fabricating an assembly for transferring current, the method comprising:
  coupling a plurality of electrically conductive brushes for supplying current to at least one electrically conductive slip ring through a plurality of respective electrical connections to adjacent ones of the electrically conductive brushes through a common electrical interface;
  coupling at least one electrically conductive lead to the common electrical interface;
  situating a plurality of inductors, each on a respective one of the electrical connections in a parallel current path for increasing a self inductance of the respective parallel current path by at least one order of magnitude.

10. The method of claim 9 wherein each one of the inductors has an inductance that is substantially equal to each of the other inductors.

11. A method for fabricating an assembly for transferring current, the method comprising:
  coupling a plurality of electrically conductive brushes for supplying current to at least one electrically conductive slip ring through a plurality of respective electrical connections to adjacent ones of the electrically conductive brushes through a common electrical interface;
  coupling at least one electrically conductive lead to the common electrical interface;
  situating a plurality of inductors, each on a respective one of the electrical connections with at least one of the inductors closer to the at least one electrically conductive lead than at least one other of the inductors, the at least one of the inductors having a higher inductance value than the at least one other of the inductors.

12. A method for fabricating an assembly for transferring current, the method comprising:
  coupling a plurality of electrically conductive brushes for supplying current to at least one electrically conductive slip ring through a plurality of respective electrical connections to adjacent ones of the electrically conductive brushes through a common electrical interface;
  coupling at least one electrically conductive lead to the common electrical interface;
  situating a plurality of inductors, each on a respective one of the electrical connections;
  adjusting an inductance of at least one of the inductors.

* * * * *

UNITED STATES PATENT AND TRADEMARK OFFICE
CERTIFICATE OF CORRECTION

PATENT NO. : 6,861,779 B2
DATED : March 1, 2002
INVENTOR(S) : Konrad R. Weeber et al.

It is certified that error appears in the above-identified patent and that said Letters Patent is hereby corrected as shown below:

Column 8,
Line 41, please delete "an electrical connection to a respective ones of the" and insert -- an electrical connection to a respective one of the --

Signed and Sealed this

Twenty-sixth Day of July, 2005

JON W. DUDAS
*Director of the United States Patent and Trademark Office*